(12) United States Patent
Cho

(10) Patent No.: US 7,396,167 B2
(45) Date of Patent: Jul. 8, 2008

(54) LENS RETRACTING STRUCTURE

(75) Inventor: Gary Cho, Taichung County (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 216 days.

(21) Appl. No.: 11/291,768

(22) Filed: Dec. 2, 2005

(65) Prior Publication Data
US 2007/0036538 A1 Feb. 15, 2007

(30) Foreign Application Priority Data
Aug. 10, 2005 (TW) .............................. 94213650 U

(51) Int. Cl.
G03B 5/02 (2006.01)
G03B 17/04 (2006.01)
G02B 15/14 (2006.01)
G02B 7/02 (2006.01)

(52) U.S. Cl. .......................... 396/349; 396/80; 396/82; 396/87; 359/696; 359/704; 359/824

(58) Field of Classification Search ................. 396/349, 396/72, 80, 82, 348, 85, 87; 359/696, 697, 359/703, 704, 821, 823, 824
See application file for complete search history.

(56) References Cited
U.S. PATENT DOCUMENTS
6,813,441 B2 * 11/2004 Yamazaki .................... 396/82

* cited by examiner

Primary Examiner—Rochelle-Ann Blackman
(74) Attorney, Agent, or Firm—Bacon & Thomas, PLLC

(57) ABSTRACT

A lens retracting structure includes a housing, an image-forming lens set moveably supported on two parallel guide rods inside the housing, and a driving mechanism for moving the image-forming lens set along the parallel guide rods between a first position and a second position by means of the engagement of a threaded coupling member of the image-forming lens set with a threaded shaft which is rotatably driven by a motor of the driving mechanism.

9 Claims, 3 Drawing Sheets

LENS RETRACTING STRUCTURE

BACKGROUND OF THE INVENTION

1. Field of the Invention

The present invention relates to image-forming lenses and more particularly, to a lens retracting structure.

2. Description of the Related Art

Following fast development of high technology, a variety of high-tech products have been intensively used to satisfy different requirements. It is the market trend to develop products having light, thin, short and small characteristics. In order to meet the requirement for a camera having a small characteristic, the size of the image-forming lens set and the related driving mechanism must be made as smaller as possible. Further, in addition to cameras, an image-forming lens set can also be used in other small mobile electronic products such as cellular telephone.

The image-forming lens set of a camera or mobile electronic product may be made retractable so as to provide zoom-in and zoom-out functions. An image-forming lens set driving mechanism for this purpose is known using a bevel gear transmission mechanism to move the image-forming lens set between the retracted position and the extended position. This design of driving mechanism has a complicated structure and heavy size, resulting in high manufacturing cost and low movement stability.

SUMMARY OF THE INVENTION

The present invention has been accomplished under the circumstances in view. It is therefore one object of the present invention to provide a lens retracting structure, which is easy and inexpensive to manufacture.

It is another object of the present invention to provide a lens retracting structure, which is highly stable and reliable upon movement.

To achieve these objects of the present invention, the lens retracting structure comprises a housing having a guide member therein, an image-forming lens set supported on the guide member inside the housing and movable along the guide member between a first position and a second position reciprocally, and a driving mechanism mounted inside the housing. The image-forming lens set has a threaded coupling member. The driving mechanism has a motor and a transmission device having a shaft rotatable by the motor. The shaft has a threaded actuating portion engaged with the threaded coupling member for driving the image-forming lens set to move along the guide member between the first position and the second position upon rotation of the shaft driven by the motor.

DETAILED DESCRIPTION OF THE INVENTION

Figure 1:
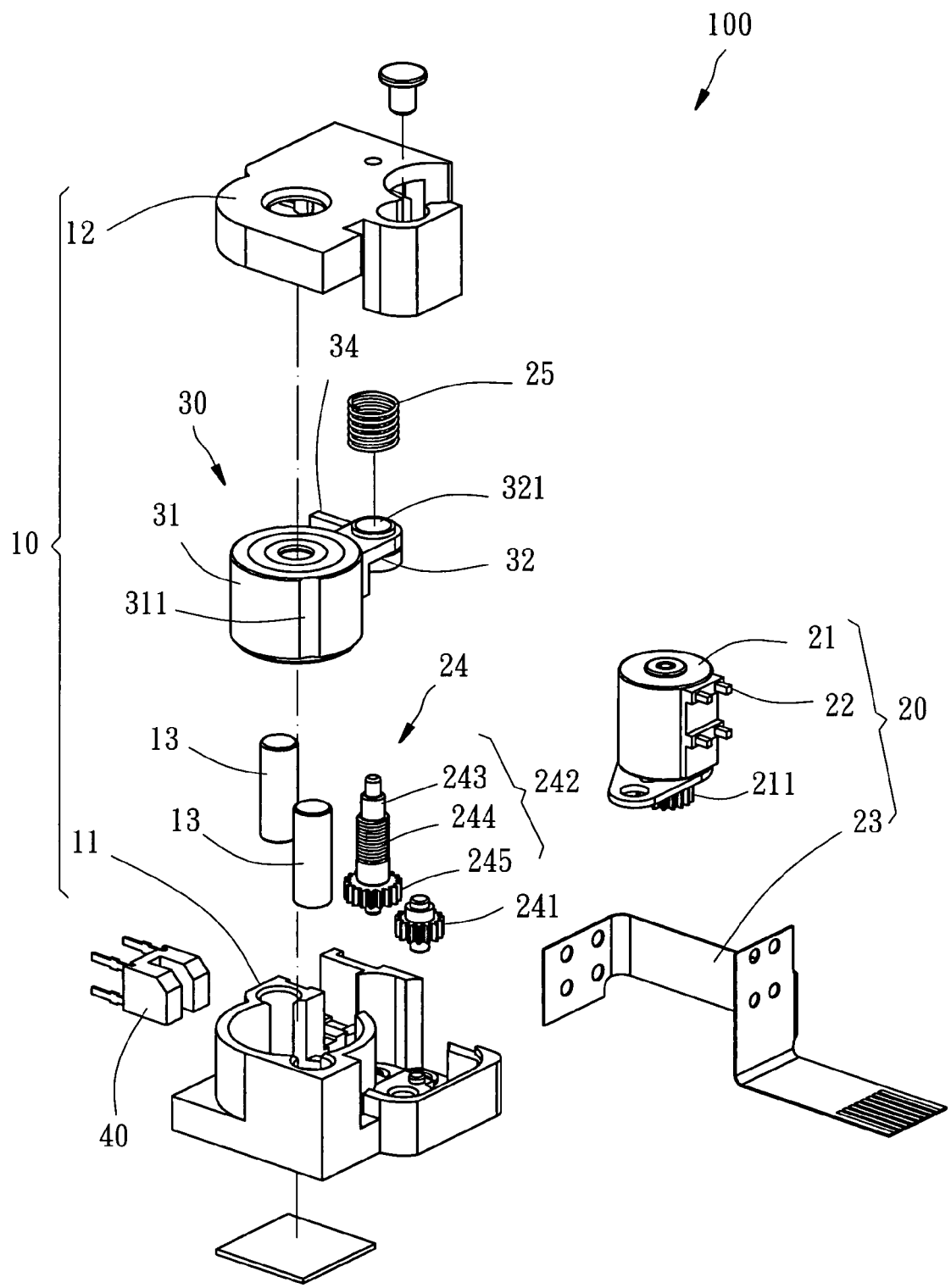
FIG. 1 is an exploded view of a lens retracting structure according to a preferred embodiment of the present invention.
Figure 2:
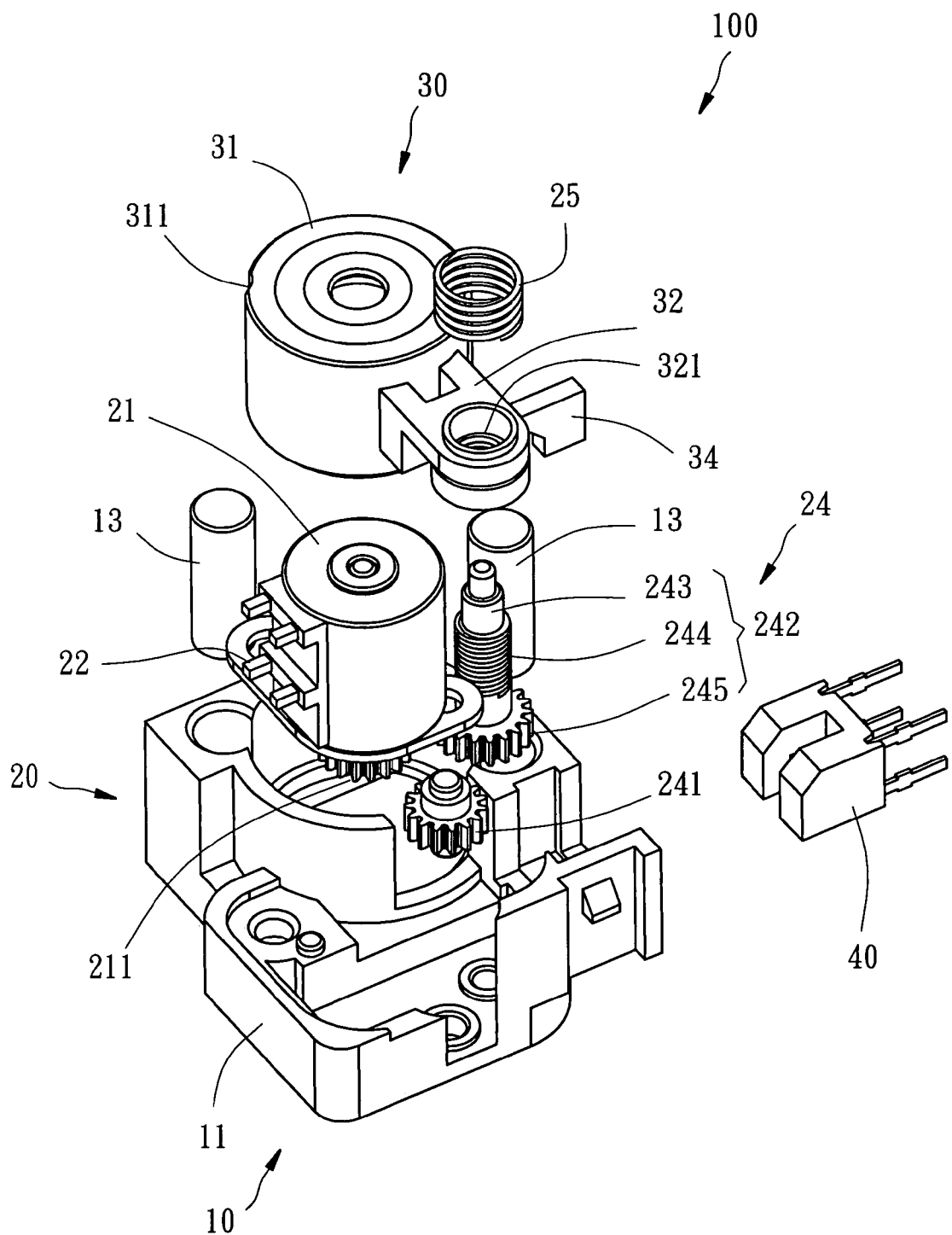
FIG. 2 is a perspective view of the lens retracting structure according to the preferred embodiment of the present invention, showing the lens retracting structure is partially assembled.

Referring to FIGS. 1 and 2, a lens retracting structure 100 in accordance with a preferred embodiment of the present invention is shown comprising a housing 10, a driving mechanism 20, an image-forming lens set 30, and a sensor 40.

The housing 10 is comprised of a first cover shell 11 and a second cover shell 12. The first and second cover shells 11 and 12 are detachably fastened together, having therein positioning backings that define accommodating spaces for receiving the other component parts.

The driving mechanism 20 comprises a motor 21, an electric connector 22, a connecting member 23, a transmission device 24, and a buffering member 25 which is a compression spring in this embodiment. The motor 21 is a mini motor mounted inside the housing 10, having a driving spur gear 211 fixedly mounted on the output shaft thereof for synchronous rotation with the output shaft of the motor. The electric connector 22 is an electric terminal electrically connected to the motor 21 and partially extending out of the housing 10. The connecting member 23 is adapted to electrically connect the electric connector 22 to an external control circuit (not shown) for transmitting control signal from the external control circuit to the motor 21 through the electric connector 22. The transmission device 24 comprises an idler spur gear 241 meshed with the driving spur gear 221 and a shaft 242 pivotally mounted in the housing 10. The shaft 242 has a shaft body 243, an actuating portion 244 which is an outer thread formed integrally on the periphery of the shaft body 243, and a driven spur gear 245 which is fixedly mounted on the lower end of the shaft body 243 and meshed with the idler spur gear 241, such that the driven spur gear 245 and the shaft 242 can be driven by the motor 21 to rotate through the driving spur gear 211 and the idler spur gear 241.

The image-forming lens set 30 comprises a lens body 31, a coupling member 32 connected to a side of the periphery of the lens body 31, and a detected member 34 connected to a lateral side of the coupling member 32. The lens body 31 is shaped like a barrel and has two longitudinal grooves 311 which extend respectively along two opposite sides of the periphery of the lens body 31 and are sleeved respectively onto two parallel upright guide rods 13 disposed at the first shell 11 of the housing 10 to guide an axial reciprocating motion of the lens body 31 along the upright guide rods 13. The coupling member 32 has a coupling hole 321 with an inner thread engaged with the actuating portion 244 of the transmission device 24. The top side of the coupling member 32 is contacted with the buffering member 25 of the driving mechanism 20.

The sensor 40 is mounted inside the housing 10 and electrically connected to an external control circuit, and adapted to detect the position of the detected member 34 of the image-forming lens set 30 and to provide the external control circuit with a signal indicative of the position of the detected member 34.

Figure 3:
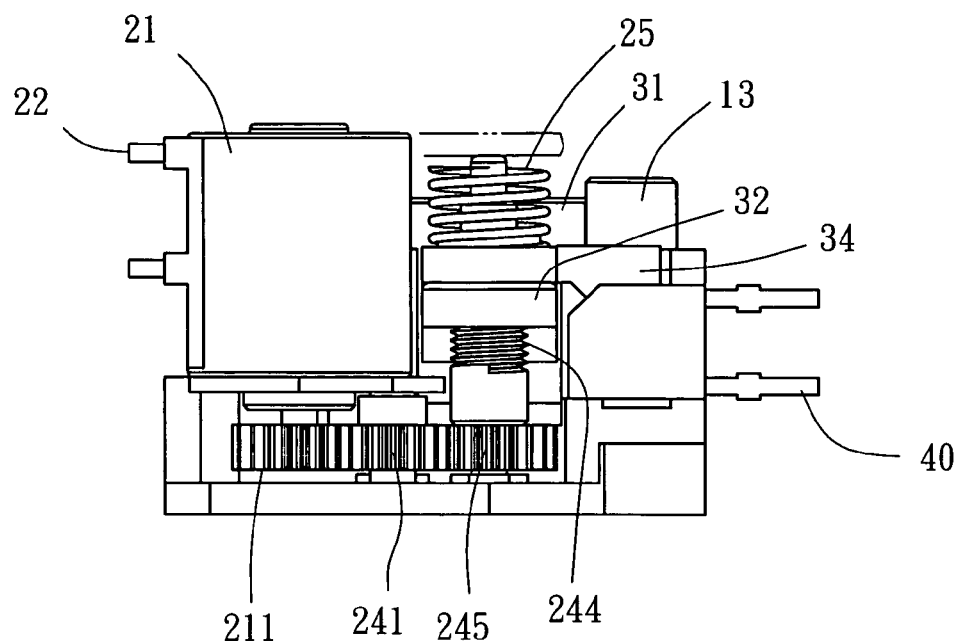
FIG. 3 is a schematic drawing according to the preferred embodiment of the present invention, showing the image-forming lens set is located at the retracted position.
Figure 4:
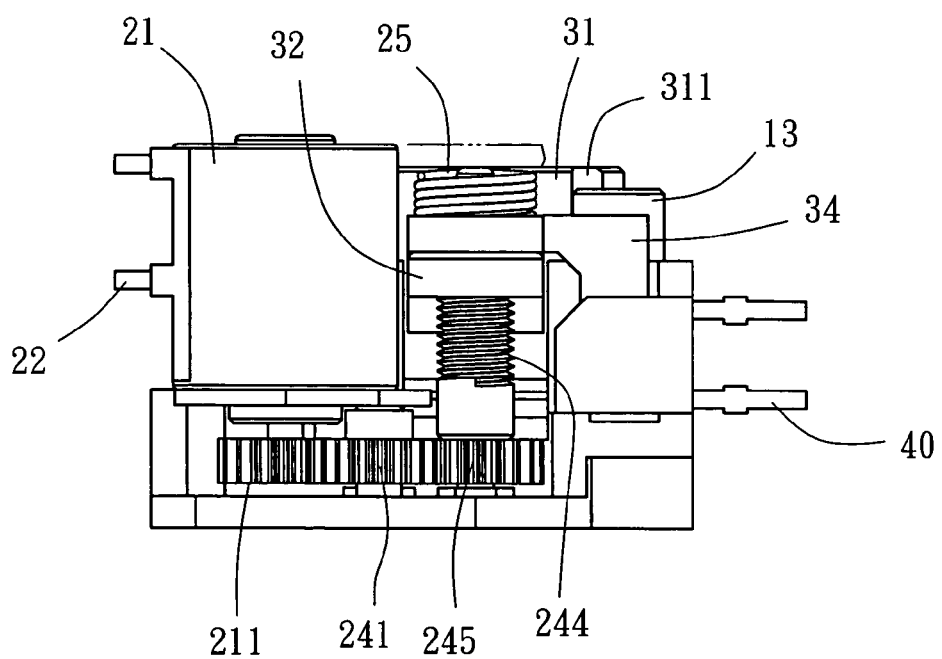
FIG. 4 is a schematic drawing according to the preferred embodiment of the present invention, showing the image-forming lens set is located at the extended position.

The operation of the lens retracting structure 100 is outlined hereinafter with reference to FIGS. 3 and 4. When moving the lens body 31 from the retracted position as shown in FIG. 3 to the extended position as shown in FIG. 4, drive the external control circuit to input a control signal or power through the connecting member 23 into the connector 22 and then the motor 21, causing the motor 21 to rotate the driving spur gear 211 through a predetermined angle. During rotation of the driving spur gear 211, the driven spur gear 245 is synchronously rotated through the idler spur gear 241 such that the actuating portion 244 of the shaft 242 will be rotated at the same time. Because the coupling portion 321 of the coupling member 32 is engaged with the actuating portion 244, the coupling member 32 is forced to move the image-forming lens set 30 outwards along the guide rods 13 from the first position (the retracted position as shown in FIG. 3) to the second position (the extended position as shown in FIG. 4) during rotation of the shaft 242. When the lens body 31 reached to the predetermined position, the sensor 40 detects the relative position of the detected member 34 and outputs a corresponding signal to the external control circuit, causing the external control circuit to stop the motor 21, and therefore the lens body 31 is held in the desired position. During the movement of the lens body 31 the buffering member (spring) 25 is always pressed on the coupling member 32 such that the lens body 31 can move stably.

When wishing the change of the lens body 31 from the second position (extended position) to the first position (retracted position), reverse the motor 21 to rotate the shaft 242 in the reversed direction, and therefore the coupling member 32 is forced to move the image-forming lens set 30 inwards along the upright guide rods 13 to the first position.

In the above-mentioned preferred embodiment, the driven spur gear 245 is driven by the driving spur gear 211 through the idler spur gear 241. In fact, the idler spur gear 241 can be eliminated if the driven spur gear 245 is designed to be directly engaged with the driving spur gear 211.

Because the invention uses spur gears to transfer the driving force from the motor to the lens body, the lens body can be stably and smoothly moved between the first position (retracted position) and the second position (extended position). Comparing to other gear structures, spur gears have the advantages of low manufacturing cost. Further, spur gears require less installation space, satisfying small size requirement.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A lens retracting structure comprising:
   a housing having a guide member therein;
   an image-forming lens set having a barrel-shaped lens body;
   two longitudinal grooves disposed on opposite side of a periphery of the barrel-shaped lens body, wherein at least one of the grooves is configured to accommodate the guide member;
   the image-forming lens set is supported on said guide member inside said housing and movable along said guide member between a first position and a second position reciprocally, said barrel-shaped lens body of said image-forming lens set is connected to a threaded coupling member; and
   a driving mechanism mounted inside said housing, said driving mechanism having a motor and a transmission device having a shaft rotatable by the motor, said shaft having a threaded actuating portion engaged with the threaded coupling member for driving said image-forming lens set to move along said guide member between said first position and said second position upon rotation of said shaft driven by said motor, the thread coupling member and the lens body are in communication as a unit such that said shaft is configured to directly drive the image-forming lens set to move toward the first position and to move toward the second position reciprocally.

2. The lens retracting structure as claimed in claim 1, wherein said housing comprises a first shell and a second shell detachably fastened to said first shell; and wherein said guide member is a rod member and at least one of the longitudinal grooves is engaged with the rod member.

3. The lens retracting structure as claimed in claim 1, wherein said motor has a driving spur gear fixedly mounted on an output shaft thereof and the shaft is provided with a driven spur gear which is rotatable by the driving spur gear.

4. The lens retracting structure as claimed in claim 1, wherein said driving mechanism further comprises an idler spur gear engaged between the driving spur gear and the driven spur gear.

5. The lens retracting structure as claimed in claim 1, wherein said driving mechanism further comprises an electric connector electrically connected to said motor and partially extending out of said housing, and a connecting member for electrically connecting said electric connector to an external control circuit for allowing said external control circuit to control the operation of said motor.

6. The lens retracting structure as claimed in claim 1, wherein said threaded actuating portion is provided with an outer thread thereon and the threaded coupling member has a hole provided with an inner thread engaged with the outer thread.

7. The lens retracting structure as claimed in claim 1, wherein said driving mechanism further comprises a buffering member springedly pressed on the image-forming lens set.

8. The lens retracting structure as claimed in claim 1, further comprising a sensor mounted inside said housing for detecting the position of said image-forming lens set and to output a signal indicative of the position of said image-forming lens set to an external control circuit.

9. The lens retracting structure as claimed in claim 8, wherein said image-forming lens set comprises a detected member detectable by said sensor.

* * * * *